US006592945B2

(12) United States Patent
Suzuki et al.

(10) Patent No.: US 6,592,945 B2
(45) Date of Patent: Jul. 15, 2003

(54) NANOPARTICLE DISPERSED STRUCTURE AND LAMINATE THEREOF

(75) Inventors: Masaaki Suzuki, Hokkaido (JP); Maria Teresa de los Arcos de Pedro, Hokkaido (JP); Yoshinori Nakata, Hokkaido (JP); Yoshiho Imai, Saga-ken (JP); Munehiro Yamaguchi, Hokkaido (JP); Nobuo Kushibiki, Kanagawa (JP); Kikuko Takeuchi, Kanagawa (JP)

(73) Assignees: Dow Corning Asia, Ltd., Tokyo (JP); Director-General of National Institute of Advanced Industrial Science & Technology, Tokyo (JP)

( * ) Notice: Subject to any disclaimer, the term of this patent is extended or adjusted under 35 U.S.C. 154(b) by 0 days.

(21) Appl. No.: 09/798,123

(22) Filed: Mar. 2, 2001

(65) Prior Publication Data

US 2001/0019774 A1 Sep. 6, 2001

(30) Foreign Application Priority Data

Mar. 3, 2000 (JP) .......................................... 2000-059467
Sep. 25, 2000 (JP) .......................................... 2000-290902

(51) Int. Cl.$^7$ .............................. B05D 3/02; B05D 1/36; B05D 1/38
(52) U.S. Cl. .................... 427/387; 427/180; 427/385.5; 427/386
(58) Field of Search ................................. 428/446, 447, 428/413, 338, 339; 427/384, 386, 387, 385.5, 180

(56) References Cited

U.S. PATENT DOCUMENTS

| | | | | | |
|---|---|---|---|---|---|
| 5,518,831 A | * | 5/1996 | Tou et al. | ................... | 427/115 |
| 5,777,433 A | * | 7/1998 | Lester et al. | ................ | 313/312 |
| 5,997,958 A | * | 12/1999 | Sato et al. | .................. | 427/125 |
| 6,162,853 A | * | 12/2000 | Braune et al. | ............. | 264/1.32 |
| 6,284,834 B1 | * | 9/2001 | Kirchmeyer et al. | ........ | 427/387 |
| 6,361,660 B1 | * | 3/2002 | Goldstein | .............. | 204/157.15 |

FOREIGN PATENT DOCUMENTS

| | | | | |
|---|---|---|---|---|
| JP | 6157771 | 6/1994 | .............. | C08J/3/00 |
| JP | 10036517 | 2/1998 | .............. | C08J/3/14 |
| JP | 8245263 | 9/1998 | ........... | C04B/35/46 |
| JP | 10292065 | 11/1998 | ........... | C08K/3/08 |
| JP | 11147958 | 6/1999 | ........... | C08G/77/60 |

OTHER PUBLICATIONS

WO 00/78282 A1; Hanke et al.; Dec. 28, 2000; entire document.*

* cited by examiner

*Primary Examiner*—Robert Dawson
*Assistant Examiner*—Michael J Feely
(74) *Attorney, Agent, or Firm*—Duane Morris LLP

(57) ABSTRACT

The present invention provides a nanoparticle dispersed structure featuring a polymer having a crosslinked structure that is chemically inert with respect to the nanoparticles and that is effective in suppressing diffusion, and provides a method for manufacturing this nanoparticle dispersion.

7 Claims, 3 Drawing Sheets

NANOPARTICLE DISPERSED STRUCTURE AND LAMINATE THEREOF

FIELD OF THE INVENTION

The present invention relates to a nanoparticle dispersed structure that is useful as an optical functional material, and to a method for manufacturing this structure. More particularly, it relates to a nanoparticle dispersed structure in which nanoparticles of a substance selected from among metals, metal compounds, and semiconductors are dispersed in a crosslinked polymer, and to a method for manufacturing this structure.

BACKGROUND OF THE INVENTION

Because they exhibit nonlinear optical effects, metal and semiconductor particles whose size is on the order of nanometers are dispersed in glass or polymers to produce nanoparticle dispersions, which have been attracting attention as optical functional materials. Known methods for dispersing nanometer-sized particles in a matrix include 1) a method in which nanometer-sized metal particles and semiconductor particles are produced by sputtering, CVD, or another vapor phase method, and the surroundings thereof are covered with an inert substance such as silica to form a deposited film on a substrate (e.g., Japanese Laid-Open Patent Application H10-292065), 2) a method in which nanoparticles are dispersed and compounded in the liquid phase in a sol-gel compound (Japanese Laid-Open Patent Application H8-245263), 3) a method in which a semiconductor component is dispersed in a polymer, after which another component is diffused into this, and this product is irradiated with a laser to form nanoparticles (Japanese Laid-Open Patent Application H10-36517), and 4) a method in which various types of nanoparticles are deposited on a polymer resin in a thermodynamically unstable state, after which this is heated to change the polymer into a thermally stable state and diffuse the nanoparticles into the polymer (Japanese Laid-Open Patent Application H6-157771). 5) Another method has been discovered in which a monomer film capable of undergoing ring-opening polymerization is formed, over which a nanoparticle film is formed, after which this product is heated to effect polymerization and diffuse the nanoparticles into the polymer film (Japanese Laid-Open Patent Application H11-147958).

While sol-gel compounds do offer the valuable benefit of allowing manufacture in the liquid phase, it is generally held that their molding workability is poor, and that the dispersed particles are unstable and tend to clump into secondary particles. When a thermoplastic polymer is used as the dispersion medium, not only does this require sophisticated technology for precipitating particles on the surface while maintaining an unstable state, and diffusing these particles in the process stabilizing the polymer, but it is also well known that these particles tend to form secondary particles in the polymer. It is commonly held that a polymer with a three-dimensionally crosslinked structure has better dispersion stability than a linear thermoplastic polymer. Also, since nanoparticle dispersed structures are attracting attention for their optical functions, such as in materials for nonlinear optical elements, it is clear that optical transparency is an important characteristic desired of the dispersion medium material. Theories pertaining to the optical effects exhibited by nanoparticles suggest that the dielectric constant of the medium affects the characteristics of the nanoparticles.

It is an object of the present invention to provide a nanoparticle dispersion featuring a polymer having a crosslinked structure that is chemically inert with respect to the nanoparticles and that is effective in suppressing diffusion, and to provide a method for manufacturing this nanoparticle dispersion.

SUMMARY OF THE INVENTION

The present invention provides a nanoparticle dispersed structure, characterized in that nanoparticles of a substance selected from among (i) metals, (ii) metal compounds, and (iii) semiconductors are dispersed in a crosslinked polymer.

The present invention also provides a method for manufacturing a nanoparticle dispersed structure, characterized in that nanoparticles of a substance selected from among (i) metals, (ii) metal compounds, and (iii) semiconductors are deposited on a solid composed of a polymer precursor having a crosslinkable structure, after which said polymer precursor is crosslinked and the nanoparticles are dispersed in the crosslinked polymer by heating.

The present invention also provides a laminate of a nanoparticle dispersed structure, produced by the lamination of the above-mentioned nanoparticle dispersed structure.

The present invention further provides a laminate of a nanoparticle dispersed structure, characterized in that a laminate is manufactured by subjecting the above-mentioned nanoparticle dispersed structure at least once to a lamination process comprising the steps of (A) forming a solid film composed of a polymer precursor having a crosslinkable structure and (B) then depositing a substance selected from among (i) metals, (ii) metal compounds, and (iii) semiconductors on said solid film, and then crosslinking said polymer precursor and dispersing the nanoparticles in the crosslinked polymer by heating so as to form a layer composed of a nanoparticle dispersed structure.

DESCRIPTION OF THE PREFERRED EMBODIMENTS

Figure 1:
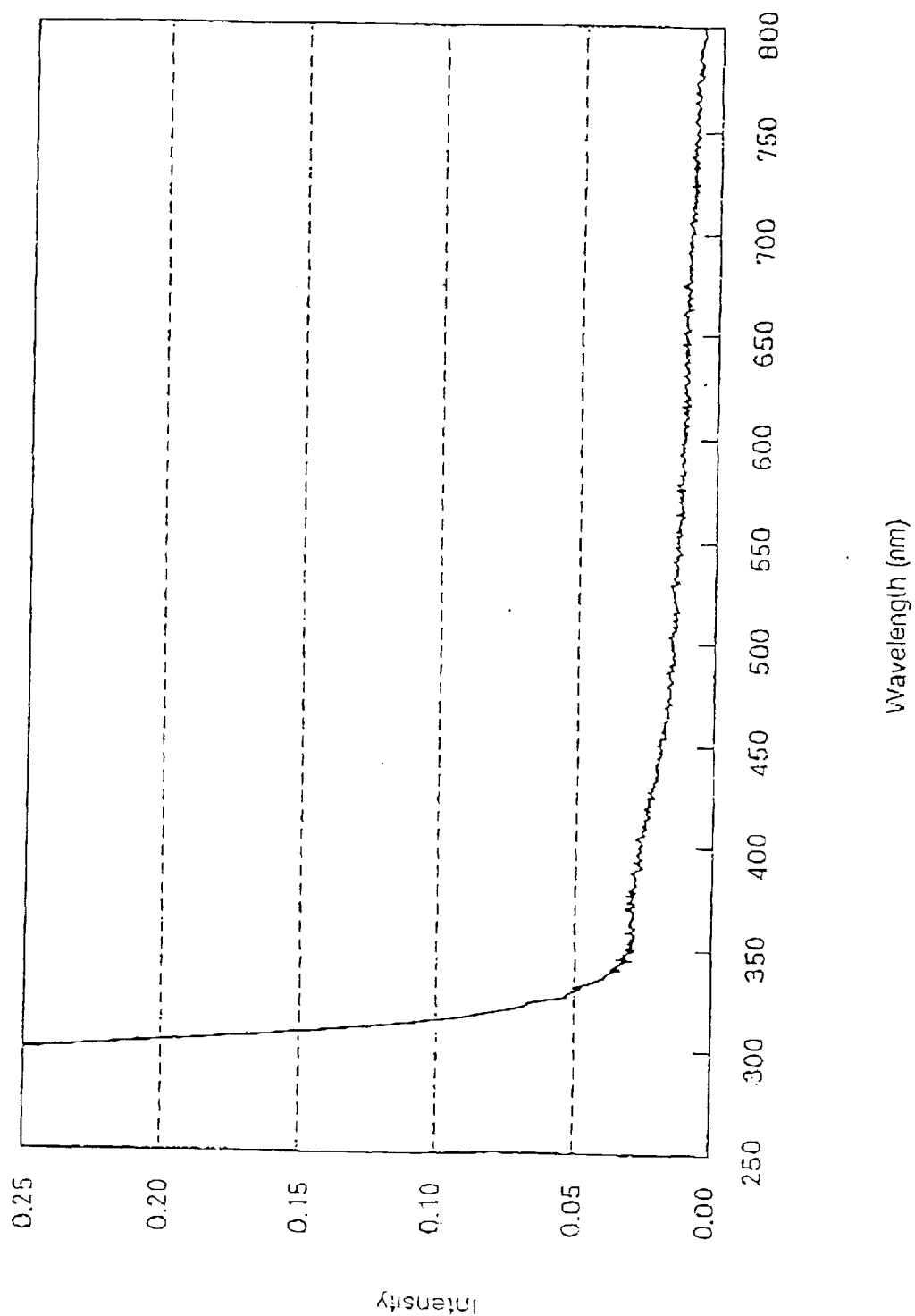
FIG. 1 is a graph of the absorption spectrum of a sample in which a first layer was formed.

It is known that, in general, the movement of polymer chains is restricted in three-dimensionally crosslinked polymers, which are collectively known as thermosetting polymers, so the diffusion of fillers or other additions mixed into the polymer is suppressed, and the dispersed state is stabilized. With the present invention, nanoparticles are dispersed and held in a crosslinked polymer material with which the nanoparticles can be prevented from agglomerating.

In the present invention, various types of curable resins that are cured by light, heat, etc., are contained in the crosslinked polymer that makes up the dispersion medium. It is essential that this curable resin comprise components having no optical absorption band within a wavelength range of at least 350 to 800 nm in a state in which no nanoparticles have been dispersed, and it is important that the optical transparency be high.

Also, in the three-dimensional crosslinking of this curable resin, it is essential that the formation of the crosslinked reticulated structure does not result in any crystal structure, and it is also necessary that the interaction between the special functional groups included in the molecules not result in any ordered structure.

In the present invention, the nanoparticles may be any particles having a diameter of 10 nm or less, which are commonly called quantum dots or nanodots. A preferable size is 1 to 5 nm, but this cannot be unconditionally specified because it will vary with the type of material forming the nanoparticles, the dielectric constant of the dispersion medium, and the targeted function. There are no particular restrictions on the material that makes up the nanoparticles, as long as it can be formed by a method that does not hinder the method discussed below for manufacturing a nanoparticle dispersed structure.

For example, this material can be a metal such as gold, silver, palladium, or copper, a semiconductor such as an elemental semiconductor (such as silicon or germanium) or a compound semiconductor (such as GaAs or CdS), a metal compound such as titanium oxide, tin oxide, or another metal oxide, or a chalcogenide, or another known substance.

The nanoparticle dispersed structure of the present invention can be manufactured by the following method, which is described step by step.

It is common knowledge that phenolformaldehyde-based thermosetting resins are called A-stage, B-stage, or C-stage according to the curing stage thereof.

A-stage: In this stage, the resin is in the form of a liquid, or the form of a solid that is soluble in a solvent and can be melted by heating. This resin is also positioned as a precursor to a polymer having a three-dimensionally crosslinked structure.

B-stage: This is the substance obtained by further heating a substance in the A-stage state, and is insoluble in solvents such as acetone, but is wetted by contact with a solvent. Also, this substance is softened into a somewhat rubbery form but does not melt when heated, and compared to the C-stage substance discussed below, can be considered to be inadequately crosslinked.

C-stage: This is the substance obtained by further heating a substance in the B-stage state, and is insoluble in solvents, is not wetted by solvents, and is not melted by heating.

A polymer having a three-dimensionally crosslinked structure is obtained by subjecting a low molecular weight compound that includes polyfunctional groups in its molecules to an addition reaction, condensation reaction, or other such reaction, but when the polymer having a three-dimensionally crosslinked structure thus obtained corresponds to a B-stage state, it is insoluble or nearly insoluble in solvents as mentioned above, so it is difficult to manufacture a film of this polymer on a substrate by dissolving the polymer in a solvent. Accordingly, an initial condensate corresponding to an A-stage state, that is, a precursor of a polymer having a three-dimensionally crosslinked structure, is usually dissolved in a solvent and used to form a film on a substrate, for example. After a film of this precursor has been formed on the substrate, nanoparticles are deposited over this by the method discussed below to form a nanoparticle layer. As discussed below, however, this nanoparticle layer is formed as a discontinuous layer in which there are grain boundaries between the nanoparticles, rather than the nanoparticles forming a continuous layer. In an effort to prevent the molten deformation of the precursor by the heating performed in the formation of this nanoparticle layer, the precursor film formed in an A-stage state on the substrate may be heated prior to the deposition of the nanoparticles, so that it enters a B-stage state, and the nanoparticles then deposited after this.

This nanoparticle layer is formed by depositing nanoparticles of a substance selected from among metals, metal compounds, and semiconductors over a solid film by a known method such as vacuum vapor deposition, sputtering, CVD, or MOCVD. Vacuum vapor deposition, sputtering, or MOCVD is generally used for depositing nanoparticles of a metal, while vacuum vapor deposition or sputtering can be performed for a semiconductor such as silicon or germanium. It is also possible to deposit nanoparticles of a metal compound by vacuum vapor deposition, sputtering, or CVD.

Depending on the method for forming the nanoparticle layer, the substrate temperature may rise to the point that the A-stage precursor melts, but this can be avoided by cooling the substrate.

It is known that at first, when the nanoparticles begin to be deposited, there are grain boundaries between the nanoparticles, but as the thickness increases, the nanoparticles gradually form a continuous layer. The nanoparticle layer must not be so thick that the nanoparticles form this continuous layer and the grain boundaries disappear.

When the nanoparticles are gold, it is well known that a discontinuous layer in which there are grain boundaries present will be formed if the particle diameter is 10 nm or less, but a continuous layer will be formed over this thickness. After the above-mentioned nanoparticle layer has been formed, the polymer precursor, which is in a B- or A-stage (only a substance that is stable at high temperature or has been stabilized by cooling), is heated and crosslinked, and the nanoparticles deposited on the polymer film are diffused into the crosslinked polymer. As a result, the crosslinked polymer precursor is in a rubber-like form.

A laminate of a nanoparticle dispersed structure can be manufactured by forming a film (second layer) composed of a nanoparticle dispersed structure over a film (first layer) composed of a previously formed nanoparticle dispersed structure. Further layers can be added by repeating this operation.

The method for forming the second and subsequent layers is the same as the method for manufacturing the first layer, that is, the above-mentioned nanoparticle dispersed structure, but the layer on which the film is formed (the first layer in the case of forming the second layer) must be such that the nanoparticle dispersed structure of the present invention is formed by crosslinking.

Specifically, first, a polymer precursor that has a crosslinkable structure and is dissolved or dispersed in a solvent is applied as a film over a film (first layer) composed of a nanoparticle dispersed structure formed by crosslinking. Here, since nearly all crosslinked polymers are insoluble in solvents, this film formation does not involve dissolving the first layer, and the dispersed state of the nanoparticles is maintained in the first layer. Next, nanoparticles are deposited, the polymer precursor is crosslinked, and heating is performed. Dispersing the nanoparticles by heating is not as crucial in the manufacture of a laminate as with a single layer. This is because with a laminate, the nanoparticles as a whole enter a dispersed state as the number of layers increases.

Examples of the crosslinked polymer used in the present invention include thermosetting resins, photosetting resins, and other resins that undergo curing reactions, but preferable examples are phenolformaldehyde and other such phenol resins, epoxy resins, and polysiloxane resins. From the standpoint of optical characteristics, a polysiloxane resin is best.

In the case of a polysiloxane resin, a polymer that has a crosslinked structure and has absorption from 190 nm to close to 1500 nm can be obtained by selecting the type of substituents on the silicon atoms thereof, but the dielectric constant can also be adjusted to a range of 3 or 4 to 2 or 3 by selection of these substituents. Similarly, the refractive index can be adjusted from about 1.35 to about 1.55.

A polysiloxane resin having siloxane units expressed by the following General Formula 1, and particularly one having siloxane units expressed by the following General Formula 2, can be used favorably as this polysiloxane resin.

$$R_nSiO_{(4-n)/2} \quad (1)$$

$$RSiO_{3/2} \quad (2)$$

In the above formulas, R is a $C_1$ to $C_{10}$ hydrocarbon group. This hydrocarbon group includes aliphatic and aromatic hydrocarbon groups. Aliphatic hydrocarbon groups include saturated and unsaturated hydrocarbon groups. Specific examples thereof include methyl, ethyl, propyl, butyl, octyl, nonyl, decyl, decenyl, cyclohexyl, cyclohexenyl, and cyclohexylmethyl. Aromatic hydrocarbon groups include $C_6$ to $C_{10}$ aryls and arylalkyls (aralkyls). Specific examples thereof include phenyl, tolyl, naphthyl, benzyl, phenethyl, and naphthylmethyl.

In in General Formula 1 above is a number within the range of 0<n<2.

In the case of a polysiloxane resin, there is no problem whatsoever if it contains colloidal silica, as long as optical transparency can be maintained after crosslinking. Any polysiloxane resin can be used as long as it will dissolve in a solvent, or can be uniformly dispersed in a suitable solvent. Dissolving such a polysiloxane resin to produce a solution also makes coating the substrate easier. A B-stage oligomer film can be formed by coating the substrate with a solution in which this polysiloxane resin is dissolved. As long as the silanol groups normally had by a polysiloxane resin are not substituted with other organic groups in this polysiloxane resin, heating will cause the silanol groups to undergo dehydration condensation and crosslinking, so the silanol groups function as crosslinking units.

Another example of a crosslinking method is one in which a polysiloxane having vinyl groups or other aliphatic unsaturated groups in its molecules is mixed with a polysiloxane having SiH groups in its molecules, and this mixture is crosslinked through a hydrosilylation reaction using a platinum compound, an organic peracid compound, or another such catalyst that is suitable for this mixture.

While it will depend on the type of substituents on the silicon atoms, the above-mentioned polysiloxane resin is a solid at room temperature, and changes to a viscous rubber-like substance when heated to between 50 and 70° C. or higher. When the crosslinking is accomplished by dehydration condensation, heating to over this temperature will form a crosslinked polysiloxane resin that is non-meltable and insoluble in solvents.

Examples of substituents on the silicon atoms of the polysiloxane resin generally include hydrogen atoms, $C_1$ to $C_8$ aliphatic hydrocarbon groups, $C_1$ to $C_6$ halogenated hydrocarbon groups, $C_1$ to $C_6$ perfluorohydrocarbon groups, and $C_1$ to $C_{10}$ aromatic hydrocarbon groups (such as phenyl groups, tolyl groups, and xylyl groups).

As mentioned above, the polysiloxane resin film is formed on the substrate by dissolving or uniformly dispersing the polysiloxane resin in a solvent, then applying this liquid by dipping, bar coating, wire coating, screen coating, spin coating, or another known method, and this film is then heated at a temperature between room temperature and about 100° C. to remove the solvent. Here, the resin can be changed from A-stage to B-stage by adjusting the heating temperature.

The diffusion of the nanoparticles into the crosslinked polymer depends on the heating temperature and heating rate from the B-stage until crosslinking. Also, molecular mobility is restricted as the crosslinking of the polymer proceeds, so the diffusion of the nanoparticles into the interior of the crosslinked polymer will of course also be limited, and it is therefore possible to adjust the diffusion of the nanoparticles into the crosslinked polymer by adjusting the degree of crosslinking in the B-stage. In addition, making the nanoparticle layer thinner narrows the particle distribution in the crosslinked polymer. It can also be narrowed by lowering the heating temperature. The particles should be left at a high temperature long enough for them to become localized, and crosslinking at a lower temperature can be considered favorable for uniform dispersal.

The nanoparticle dispersed structure obtained with the present invention is expected to find use in a variety of applications depending on the type of crosslinked polymer or the type of nanoparticles being used. Of these applications, materials composed of a nanoparticle dispersed structure in which nanoparticles are dispersed in an optically transparent polysiloxane resin are in particular expected to find use in the field of optoelectronics as nonlinear optical materials that manifest the quantum effects exhibited by these nanoparticles. Also, because they are optically transparent and easy to manufacture, these materials can be used in various optical applications such as diffraction lattices and optical reflection films.

EXAMPLES

The present invention will now be described in further detail through examples.

Example 1

A polysiloxane resin ($CH_3SiO_{3/2}$) with an average molecular weight of 20,000 was dissolved in methyl isobutyl ketone, this solution was applied to a glass substrate by spin coating, and the coating was dried for 2 hours at 50° C. The temperature was then raised to 100° C. to render the coating insoluble in methyl isobutyl ketone.

Using a sputtering device made by JEOL (JFC1100), this sample was sputtered with gold for 10 seconds in an argon atmosphere (130 Pa) at 500 V and 8 mA. This product was observed under a scanning electron microscope, which revealed that gold nanoparticles with an average diameter of 1.2 nm had been deposited on the surface of the above-mentioned polysiloxane resin.

This sample was heated for 30 minutes at 180° C. in an electric furnace to crosslink the polysiloxane resin and at the same time diffuse the nanoparticles of gold from the surface into the interior of the polysiloxane resin, the result being a nanoparticle dispersed structure. It was confirmed as follows by XPS that the gold nanoparticles had diffused into the film composed of the nanoparticle dispersed structure. In XPS, the spectrum indicating the bonding energy of 4f electrons of gold atoms is observed in the vicinity of 84 eV, and in the case of 2p electrons of silicon atoms, in the vicinity of 103 eV. The intensity of the XPS spectrum of each of these at the polysiloxane resin surface before and after heating (I[Au, 4f] and I[Si, 2p]) was used to find I[Au, 4f]/I[Si, 2p], a comparison was made for before and after heating, and it was found that the concentration of gold after heating was less than one-fourth the concentration before heating. XPS measurement had no effect on the polysiloxane resin surface, and in particular no effect on silicon atoms (the same applies to Example 2). The above-mentioned I[Au, 4f] expresses the intensity of 4f electrons of gold atoms, while I[Si, 2p] expresses the intensity of 2p electrons of silicon atoms.

Example 2

A polysiloxane resin containing phenyl groups (DC840, made by Dow Corning) was dissolved in toluene, and a film composed of this polysiloxane resin and measuring approximately 1 μm was formed over a glass substrate by spin coating. Using a sputtering device made by JEOL (JFC1100), this sample was sputtered with gold for 20 seconds in an argon atmosphere (130 Pa) at 500 V and 8 mA. This product was observed under a scanning electron microscope, which revealed that gold nanoparticles with an average diameter of 2 nm had been deposited on the above-mentioned film.

This product was then heated in the same manner as in Example 1, and the XPS spectrum was measured before and after heating. The intensity of the XPS spectrum of each of these at the polysiloxane resin surface before and after heating (I[Au, 4f] and I[Si, 2p]) was used to find I[Au, 4f]/I[Si, 2p], a comparison was made for before and after heating, and it was found that the concentration of gold after heating was approximately one-half the concentration before heating.

Example 3

A dispersion was prepared by dispersing a polysiloxane composition (($MeSiO_{3/2})_{0.6}(SiO_2)_{0.4}$) in isopropyl alcohol in a solids concentration of 30%. This dispersion was applied to a white board slide glass by spin coating and dried for 4 hours at 50° C. to form an A-stage polysiloxane resin composition film.

Using a sputtering device made by JEOL (JFC1100), this sample was sputtered with gold for 20 seconds in an argon atmosphere (130 Pa) at 500 V and 8 mA to form nanoparticles of gold. This sample was heated for 30 minutes at 150° C. in air in an electric furnace to form a first layer. Since nanoparticles exhibit plasmon absorption, the absorption spectrum of this sample was measured with a Hitachi 3400 spectrophotometer. These results are shown in FIG. 1. No distinct plasmon absorption was detected, but observation under a scanning electron microscope revealed gold nanoparticles with an average diameter of 3 nm.

Next, a resin layer the same as the first resin layer was formed over this by spin coating, and this was dried at 50° C. Nanoparticles of gold were then formed under the same conditions as for the first layer, and this was heated for 30 minutes at 150° C. to form a second layer.

Figure 2:
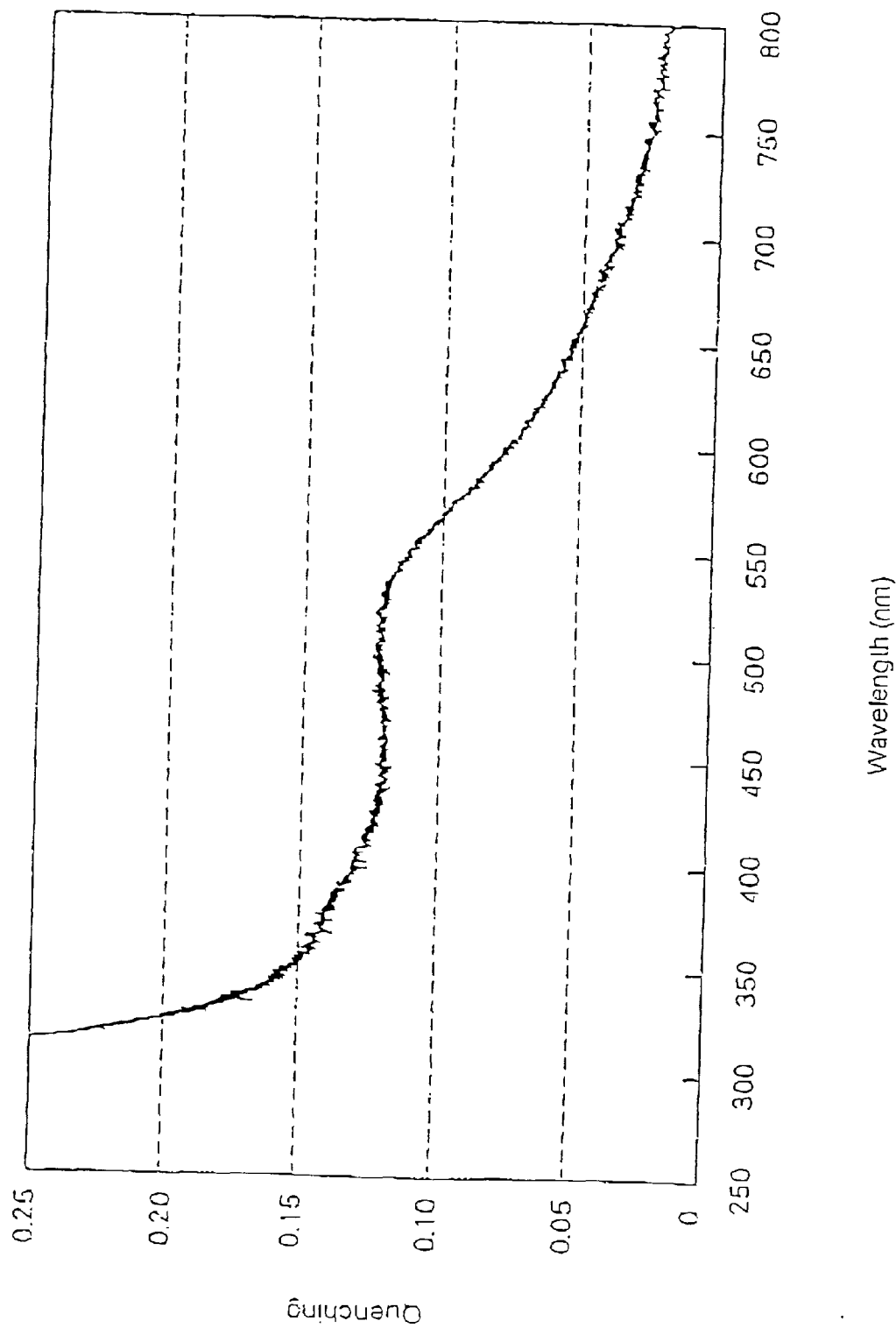
FIG. 2 is a graph of the absorption spectrum of a laminate with a 12-layer dispersed structure.

This operation was repeated 12 times to form a laminate of a dispersed structure having 12 layers of gold nanoparticles. The absorption spectrum was measured for this laminate, the results of which are given in FIG. 2. With this laminate, plasmon absorption having an absorption peak at 500 to 550 nm was detected.

Figure 3:
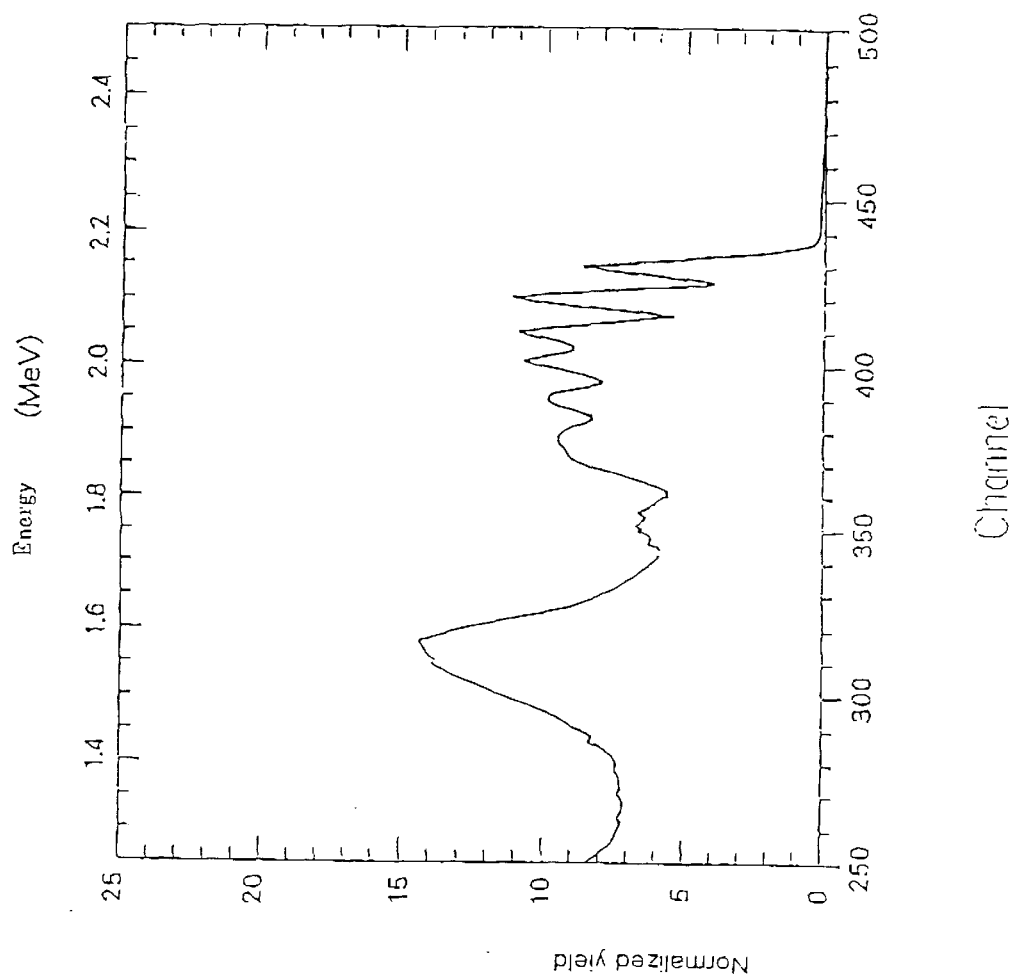
FIG. 3 is a spectral chart giving the results of measuring laminate with a 12-layer dispersed structure using a Ratherford backscattering spectrometer.

The distribution of gold in the depth direction of this laminate was also measured using a Ratherford backscattering spectrometer and a 100° detection angle for the ion beam. The spectral chart thereof is shown in FIG. 3. A layer structure was confirmed in layers 6 to 12 from the substrate side, whereas hysteresis over an extended period caused the layer structure to disappear from layers 1 to 6.

We claim:

1. A method for manufacturing a nanoparticle dispersed polymer comprising the sequential steps of:
   a) depositing a polymer precursor on a substrate to form a film on said substrate, wherein said precursor has a crosslinkable structure and is present in an A-stage state;
   b) optionally heating said polymer precursor film, so that said polymer precursor film undergoes a transition from an A-stage state to a B-stage state;
   c) depositing nanoparticles on said A-stage or B-stage polymer precursor film; and
   d) heating said A-stage or B-stage polymer precursor film, resulting in crosslinking of the polymer precursor film and diffusion of said nanoparticles into the crosslinked polymer film;

wherein said nanoparticles are selected from the group consisting of metals, metal compounds, and semiconductors.

2. The method as recited in claim 1, wherein the crosslinked polymer is a polysiloxane resin having units expressed by the following formula:

$$R_nSiO_{(4-n)/2}$$

where R is a $C_1$ to $C_{10}$ hydrocarbon group, and n is a number greater than zero and less than 2.

3. The method as recited in claim 2, wherein the crosslinked polymer is a polysiloxane resin having unit expressed by the following formula:

$$RSiO_{3/2}$$

where R is a $C_1$ to $C_{10}$ hydrocarbon group.

4. The method as recited in claim 1, wherein the nanoparticles have a diameter of 10 nm or less.

5. The method as recited in claim 4, wherein the nanoparticles have a diameter of 1 to 5 nm.

6. The method as recited in claim 1, wherein the metal compound is titanium oxide or tin oxide.

7. The method as recited in claim 1, wherein the crosslinked polymer is selected from the group consisting of phenolformaldehyde resins, epoxy resins and polysiloxane resins.

* * * * *